United States Patent
Xie et al.

(10) Patent No.: US 9,276,627 B2
(45) Date of Patent: Mar. 1, 2016

(54) LEAFING LEATHER COVER OF CELLULAR PHONE AND SMART PHONE USING THE SAME

(71) Applicant: HUIZHOU TCL MOBILE COMMUNICATION CO., LTD., Huizhou, Guangdong (CN)

(72) Inventors: Jinhua Xie, Huizhou (CN); Runlai Jiang, Huizhou (CN); Yuanliang Xu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 14/382,257

(22) PCT Filed: Apr. 11, 2013

(86) PCT No.: PCT/CN2013/074099
§ 371 (c)(1),
(2) Date: Aug. 29, 2014

(87) PCT Pub. No.: WO2014/117438
PCT Pub. Date: Aug. 7, 2014

(65) Prior Publication Data
US 2015/0024812 A1    Jan. 22, 2015

(30) Foreign Application Priority Data

Jan. 29, 2013 (CN) .......................... 2013 1 0033414

(51) Int. Cl.
*H04B 1/3888* (2015.01)
*H04M 1/02* (2006.01)
*H04M 1/23* (2006.01)

(52) U.S. Cl.
CPC ........... *H04B 1/3888* (2013.01); *H04M 1/0202* (2013.01); *H04M 1/0283* (2013.01); *H04M 1/0214* (2013.01); *H04M 1/23* (2013.01)

(58) Field of Classification Search
CPC ... H04M 1/0214; H04M 1/23; H04M 1/3833; H04M 1/0247; H04M 1/0237; H04M 1/3888; H04M 1/0283; H04M 1/18; H04B 1/3888
See application file for complete search history.

(56) References Cited

U.S. PATENT DOCUMENTS 7,493,151 B2    2/2009 Collins
2005/0090299 A1    4/2005 Tsao
(Continued)

FOREIGN PATENT DOCUMENTS

CN    201270893 Y    7/2009
CN    201365636    12/2009
(Continued)

OTHER PUBLICATIONS

International Search Report mailed Nov. 7, 2013.

*Primary Examiner* — Leon-Viet Nguyen
(74) *Attorney, Agent, or Firm* — Ladas & Parry LLP

(57) ABSTRACT

A leafing leather cover of cellular phone and a smart phone using the same are described. The leafing leather cover of cellular phone includes a leather cover wherein the leather cover is connected to a rear shell body of the smart phone by way of a micro-buckling connection portion, a clasping portion is disposed on the micro-buckling connection portion, the clasping portion adapts to the clasping hole in the rear shell body, and the clasping portion is embedded to a clasping ring in the clasping hole. The present invention employs the leafing leather cover to be easily disassembled and to be conveniently cleaned.

17 Claims, 5 Drawing Sheets

(56) References Cited

U.S. PATENT DOCUMENTS

2012/0094728 A1* 4/2012 Lee .................. G06F 1/1635 455/572
2014/0043121 A1* 2/2014 Sartee .................. G06F 1/16 335/219

FOREIGN PATENT DOCUMENTS

| CN | 202269549 | 6/2012 |
| EP | 2005716 | 6/2010 |
| JP | 2011-176623 A | 9/2011 |

* cited by examiner

LEAFING LEATHER COVER OF CELLULAR PHONE AND SMART PHONE USING THE SAME

CROSS REFERENCE TO RELATED APPLICATION

This application claims the priority of International Application No. PCT/CN2013/074099, filed on Apr. 11, 2013, which claims priority to Chinese Application No. 201310033414.X, filed on Jan. 29, 2013. The entire disclosures of each of the above applications are incorporated herein by reference.

FIELD OF THE INVENTION

The present invention relates to a protection cover of smart phone case, and more particularly to a leafing leather cover of cellular phone to be easily disassembled and to be conveniently cleaned in the smart phone.

BACKGROUND OF THE INVENTION

With the continuous development of mobile communication technology and the rise of the smart phone, there is an increasing demand for a large display size, a diminished thickness, and better protection of the smart phone. For example, a conventional leafing leather cover buckled to the front side of the smart phone to protect the touch panel thereof is provided.

However, the conventional leafing leather cover is directly welded on the battery covering with plastic material by way of ultrasonic or hot melt technique and the battery covering is then fastened to the smart phone case by way of a buckling element on the battery covering. While using the smart phone, it is difficult to disassemble and assemble and to clean up the conventional leafing leather cover. Further, the constant disassembling and assembling easily damages the buckling element of the battery covering, which results in improperly deforming, over-loosening or over-tightening the buckling element, and even fracturing the buckling element.

Consequently, there is a need to develop a novel leafing leather cover to solve the aforementioned problems.

SUMMARY OF THE INVENTION

To solve the aforementioned problems, one objective of the present invention is to provide a leafing leather cover of cellular phone to be easily disassembled and to be conveniently cleaned.

Another objective of the present invention is to provide a smart phone employing the leafing leather cover of cellular phone to be easily disassembled and conveniently cleaned.

According to the above objectives, one embodiment of the present invention sets forth a leafing leather cover of cellular phone comprising: a leather cover, for buckling to a touch panel of a smart phone; wherein the leather cover is connected to a rear shell body of the smart phone by way of a micro-buckling connection portion, a clasping portion is disposed on the micro-buckling connection portion, the clasping portion adapts to the clasping hole in the rear shell body, and the clasping portion is embedded to a clasping ring in the clasping hole; wherein a magnetic strip disposed in the leather cover is attracted to a magnet in a front shell body of the smart phone, and the magnetic strip is disposed in the other side opposite to a connection side of the leather cover; and wherein a recess slot is disposed in an assembly surface of the micro-buckling connection portion and the recess slot is used to fasten a connection side of the leather cover, a side of the recess slot communicates with a lateral surface of the micro-buckling connection portion, and a bottom region of the clasping portion is integrally connected to a bottom surface of the recess slot.

In the leafing leather cover of the cellular phone, the magnetic strip is embedded to an internal portion of the leather cover.

In the leafing leather cover of the cellular phone, a plurality of stationary posts are further disposed on the bottom surface of the recess slot for fastening the leather cover, a first stationary hole are disposed on the connection side of the leather cover to be passed by the stationary posts, a steel sheet is used to tightly press the connection side of the leather cover in the recess slot of the micro-buckling connection portion, and a second stationary hole is disposed in the steel sheet to be passed by the stationary posts.

In the leafing leather cover of the cellular phone, the connection side of the leather cover further comprises a first notch for preventing an interference with the clasping portion, and the steel sheet further comprises a second notch for avoiding the interference with the clasping portion.

In the leafing leather cover of the cellular phone, a transparent Mylar sheet is covered with the surface of the steel sheet, and a plurality of third notches disposed on the transparent Mylar sheet adapts to the clasping portion to be passed therethrough.

Another embodiment of the present invention sets forth a leafing leather cover of cellular phone comprising: a leather cover, for buckling to a touch panel of a smart phone; wherein the leather cover is connected to a rear shell body of the smart phone by way of a micro-buckling connection portion, a clasping portion is disposed on the micro-buckling connection portion, the clasping portion adapts to the clasping hole in the rear shell body, and the clasping portion is embedded to a clasping ring in the clasping hole.

In the leafing leather cover of the cellular phone, a magnetic strip disposed in the leather cover is attracted to a magnet in a front shell body of the smart phone, and the magnetic strip is disposed in the other side opposite to a connection side of the leather cover.

In the leafing leather cover of the cellular phone, the magnetic strip is embedded to an internal portion of the leather cover.

In the leafing leather cover of the cellular phone, a recess slot is disposed in an assembly surface of the micro-buckling connection portion and the recess slot is used to fasten a connection side of the leather cover, a side of the recess slot communicates with a lateral surface of the micro-buckling connection portion, and a bottom region of the clasping portion is integrally connected to a bottom surface of the recess slot.

In the leafing leather cover of the cellular phone, a plurality of stationary posts are further disposed on the bottom surface of the recess slot for fastening the leather cover, a first stationary hole are disposed on the connection side of the leather cover to be passed by the stationary posts, a steel sheet is used to tightly press the connection side of the leather cover in the recess slot of the micro-buckling connection portion, and a second stationary hole is disposed in the steel sheet to be passed by the stationary posts.

In the leafing leather cover of the cellular phone, the connection side of the leather cover further comprises a first notch for preventing an interference with the clasping portion, and the steel sheet further comprises a second notch for avoiding the interference with the clasping portion.

In the leafing leather cover of the cellular phone, a transparent Mylar sheet is covered with the surface of the steel sheet, and a plurality of third notches disposed on the transparent Mylar sheet adapts to the clasping portion to be passed therethrough.

Still another embodiment of the present invention sets forth a smart phone comprising a cellular phone body and a leafing leather cover which is disposed on a surface of the cellular phone body, and the leafing leather cover of cellular phone comprising a leather cover for buckling to a touch panel of the smart phone;

wherein the leather cover is connected to a rear shell body of the smart phone by way of a micro-buckling connection portion, a clasping portion is disposed on the micro-buckling connection portion, a clasping hole disposed in the rear shell body of the cellular phone body adapts to the clasping portion to be passed therethrough, a clasping ring is disposed on an internal side of the rear shell body near the clasping hole, and the clasping portion adapts to the clasping hole in the rear shell body, and the clasping portion is embedded to a clasping ring in the clasping hole.

In the smart phone, a magnetic strip disposed in the leather cover is attracted to a magnet in a front shell body of the smart phone, and the magnetic strip is disposed in the other side opposite to a connection side of the leather cover.

In the smart phone, the magnetic strip is embedded to an internal portion of the leather cover.

In the smart phone, a recess slot is disposed in an assembly surface of the micro-buckling connection portion and the recess slot is used to fasten a connection side of the leather cover, a side of the recess slot communicates with a lateral surface of the micro-buckling connection portion, and a bottom region of the clasping portion is integrally connected to a bottom surface of the recess slot.

In the smart phone, a plurality of stationary posts are further disposed on the bottom surface of the recess slot for fastening the leather cover, a first stationary hole are disposed on the connection side of the leather cover to be passed by the stationary posts, a steel sheet is used to tightly press the connection side of the leather cover in the recess slot of the micro-buckling connection portion, and a second stationary hole is disposed in the steel sheet to be passed by the stationary posts.

In the smart phone, the connection side of the leather cover further comprises a first notch for preventing an interference with the clasping portion, and the steel sheet further comprises a second notch for avoiding the interference with the clasping portion.

In the smart phone, a transparent Mylar sheet is covered with the surface of the steel sheet, and a plurality of third notches disposed on the transparent Mylar sheet adapts to the clasping portion to be passed therethrough.

The present invention provides a leafing leather cover of cellular phone and a smart phone using the same. By using the clasping portion and clasping rings, the clasping ring clips the clasping portion to connect the leafing leather cover to the smart phone case. In this manner, the leafing leather cover of cellular phone is easily disassembled and to be conveniently cleaned in the smart phone for increasing the life-span of the leafing leather cover and avoiding the damage of the buckling element on the battery cover.

DETAILED DESCRIPTION OF THE PREFERRED EMBODIMENTS

The foregoing aspects and many of the attendant advantages of this invention will become more readily appreciated as the same becomes better understood by reference to the following detailed description but rather than limiting of the present invention.

Figure 1:
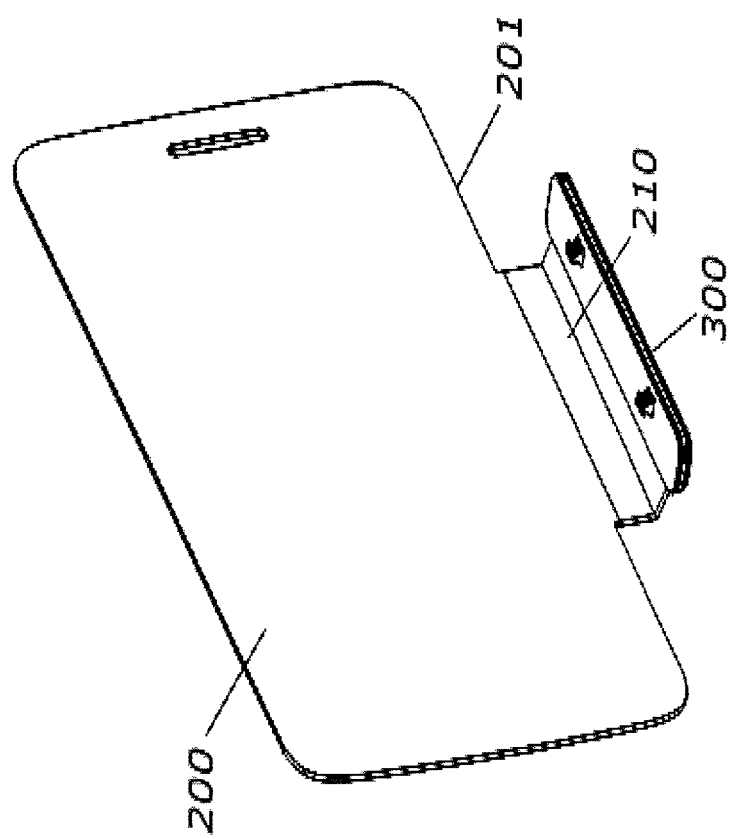
FIG. 1 is a schematic view of a leafing leather cover of cellular phone according to one embodiment of the present invention.

As shown in FIG. 1, it is a schematic view of a leafing leather cover of cellular phone according to one embodiment of the present invention. The leafing leather cover of cellular phone includes a leather cover 200 and a micro-buckling connection portion 300. A connection side 201 of the leather cover 200 forms a partial extending portion to serve as a bending portion 210 of the leather cover 200. The micro-buckling connection portion 300 is disposed on the bending portion 210 for mounting one side of the leather cover 200 on the shell body of the smart phone.

Figure 2:
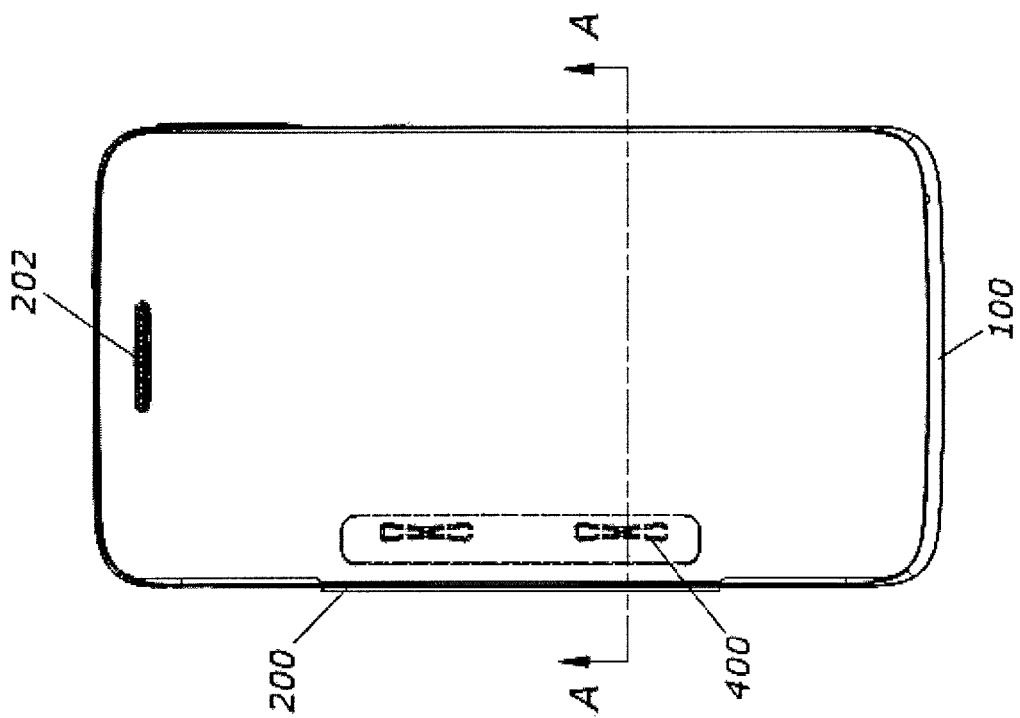
FIG. 2 is a schematic front side view of the smart phone according to one embodiment of the present invention.

Referring to FIG. 2, it is a schematic front side view of the smart phone according to one embodiment of the present invention. The leather cover 200 is fastened to touch panel of the smart phone 100 for protecting the screen of the touch panel from damage. A hollow opening 202 is disposed in the upper portion of the leather cover 200 and receives the calls when the leather cover 200 is covered with the smart phone 100 to prevent the finger, cheek or ear from contacting the touch panel, which affects the communication.

Figure 3:
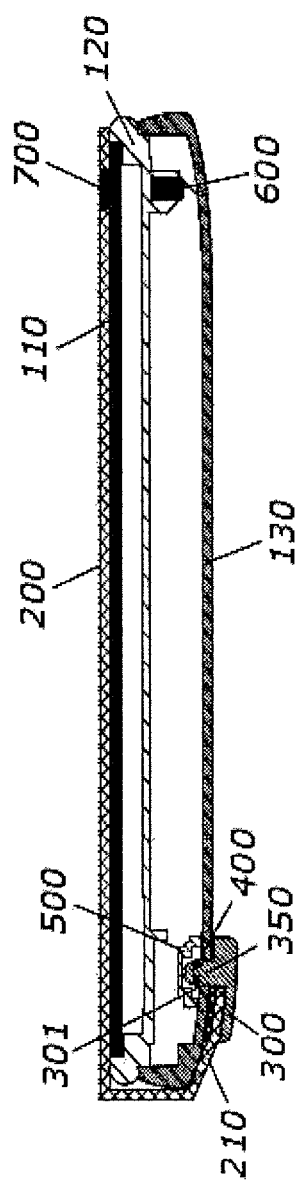
FIG. 3 is a schematic cross-sectional enlarged view of the smart phone along line A-A according to one embodiment of the present invention.

FIG. 3 is a schematic cross-sectional enlarged view of the smart phone along line A-A according to one embodiment of the present invention. The bending portion 210 of the leather cover 200 is connected to the clasping hole 301 of the rear shell body 130 by way of the micro-buckling connection portion 300. By using the micro-buckling connection portion 300, one side of the leather cover 200 is connected to the shell body of the smart phone case so that the leafing leather cover of cellular phone is easily disassembled and conveniently cleaned. The clasping portion is adapted for the clasping hole 301 properly, such as the matching status of the same shape, size and position between the clasping portion and clasping hole 301.

Specifically, the clasping portion 350 is disposed on the assembly surface of the micro-buckling connection portion 300. The clasping hole 301 disposed in the rear shell body 130 correspondingly adapts to the clasping portion 350 to be passed therethrough. A plurality of clasping rings 400 are disposed on the internal side of the rear shell body 130 in form of two opposite concave shapes, as shown by the dashed line in FIG. 2. The clasping rings 400 are used to clasp the opposite recesses of the clasping portion 350 for holding the micro-buckling connection portion 300 when the clasping portion 350 is inserted to the rear shell body 130 correspondingly. In other words, the clasping portion 350 is embedded to the clasping ring 400 in the clasping hole 301 so that the leather cover 200 is connected to the rear shell body 130 of the smart phone 100 by way of the micro-buckling connection portion 300. Thus, after the leather cover 200 is removed from the smart phone 100, only two square clasping holes 301 remain in the rear shell body 130. Therefore, the leafing leather cover is easily disassembled and the case of smart phone 100 is conveniently cleaned to maintain the leafing leather cover sanitary.

Preferably, the clasping rings 400 is fastened to the clasping hole 301 of the rear shell body 130 by way of the strip ribs or posts (not shown) in the internal side of the rear shell body 130. Further, a clasping ring lid 500 is disposed around the clasping ring 400 on the rear shell body 130 to prevent the clasping ring 400 from coming off the rear shell body 130.

In one preferred embodiment of the leafing leather cover of cellular phone according to present invention, an inner magnet 600 is fastened to the front shell body 120 of the smart phone 100 and the magnetic induction region of the inner magnet 600 reaches the external side of the touch panel 110. Correspondingly, an outer magnet 700 fastened to the leather cover 200 is used to mutually attract the inner magnet 600. When the leather cover 200 is buckled to the smart phone, the outer magnet 700 enters the magnetic induction region of the inner magnet 600. Thus, a mutual magnetic attraction force between the outer magnet 700 and the inner magnet 600 is generated so that the leafing side of the leather cover 200 is attached to the touch panel 110 to be locked for preventing the leather cover 200 from arbitrarily leafing.

The outer magnet 700 forms a strip shape to be embedded to the internal portion of the leather cover 200 in order to conveniently clean the leather cover 200. The outer magnet 700 is disposed in a free side opposite to the connection side 201 of the leather cover 200, i.e. the other side opposite to the connection side 201. Preferably, the outer magnet 700 is disposed in the lower and middle position of the leather cover 200 for conveniently leafing the leather cover 200 by way of fingers.

Figure 4:
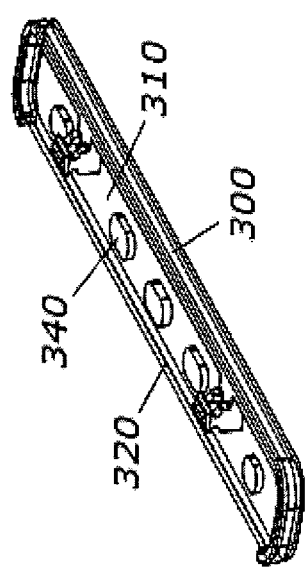
FIG. 4 is a schematic three-dimensional exploded view of a micro-buckling connection portion of the leafing leather cover of cellular phone according to one embodiment of the present invention.

FIG. 4 is a schematic three-dimensional exploded view of a micro-buckling connection portion of the leafing leather cover of cellular phone according to one embodiment of the present invention. A recess slot 310 is disposed in the assembly surface of the micro-buckling connection portion 300 and the recess slot 310 is used to fasten the bending portion 210 of the leather cover 200 to reduce the thickness of the micro-buckling connection portion 300. One side of the recess slot 310 communicates with the lateral surface of the micro-buckling connection portion 300 for conveniently containing the bending portion 210 of the leather cover 200. The bottom of clasping portion 350 is integrally connected to the bottom surface of the recess slot 310.

Figure 5:
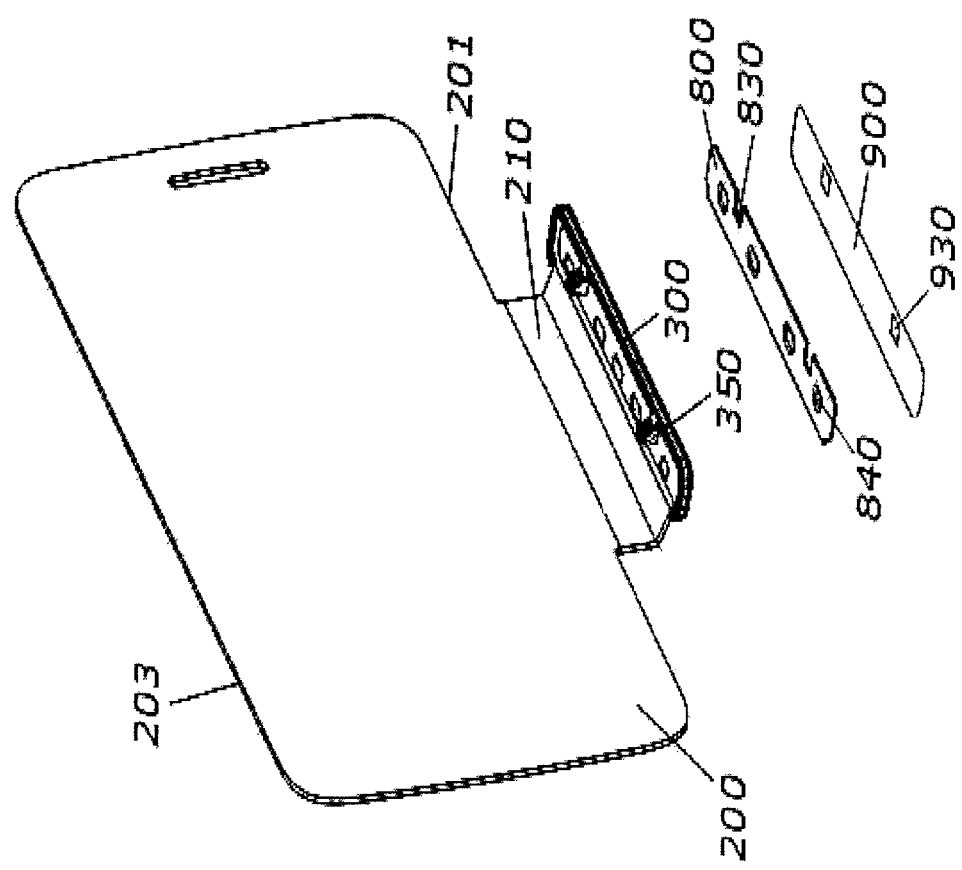
FIG. 5 is a partially schematic exploded view of the leafing leather cover of cellular phone according to one embodiment of the present invention.

Further, a plurality of stationary posts 340 are further disposed on the bottom surface of the recess slot 310 for fastening the leather cover 200. The lateral side of the recess slot 310 further includes a buckling rib 320. FIG. 5 is a partially schematic exploded view of the leafing leather cover of cellular phone according to one embodiment of the present invention. A first stationary hole (not shown), which the stationary posts 340 pass through, are disposed on the bending portion 210 of the leather cover 200. A steel sheet 800 is used to tightly press the bending portion 210 of the leather cover 200 in the recess slot 310 of the micro-buckling connection portion 300. The second stationary holes 840 are disposed in the steel sheet 800 to be passed by the stationary posts 340. The buckling rib 320 is adapted to the steel sheet 800 to tightly press the leather cover 200. The steel sheet 800 is capable of pressing the bending portion 210 of the leather cover 200 and the micro-buckling connection portion 300 together and the steel sheet 800 is attached to the stationary posts 340 by way of laser welding manner.

Moreover, in one embodiment, the bending portion 210 of the leather cover 200 further includes the first notch (not shown) for preventing the interference with the clasping portion 350. The steel sheet 800 further includes the second notches 830 for avoiding the interference with the clasping portion 350 to reduce the thickness of the micro-buckling connection portion 300 except the clasping portion 350.

Additionally, in one embodiment, a transparent Mylar sheet 900 is covered with the surface of the steel sheet 800 so that the external appearance of the components of leafing leather cover are hidden to be aesthetic, openhanded and cleaned conveniently. A plurality of third notches 930 disposed on the transparent Mylar sheet 900 adapts to the clasping portion to be passed therethrough.

Based on the aforementioned leafing leather cover of cellular phone, the present invention provides a smart phone including a cellular phone body and a leafing leather cover which is disposed on the outer surface of the cellular phone body. The clasping hole disposed in the rear shell body of the cellular phone body adapts to the clasping portion to be passed therethrough. The clasping rings 400 are disposed on the internal side of the rear shell body 130 near the clasping hole to clip the clasping portion. The leafing leather cover is applicable to the leafing leather cover of cellular phone in the above-mentioned embodiments. Further, the magnet is disposed in the front shell body of the smart phone. The connection structure between the cellular phone body and the leafing leather cover are simplified. If there is no need to cover the cellular phone by the leafing leather cover, it is required to slightly pull and drag the micro-buckling connection portion along the direction perpendicular to the rear shell body of the smart phone for separating the leafing leather cover from the cellular phone body. Therefore, the leafing leather cover of cellular phone is easily disassembled and conveniently cleaned to satisfy the user habits.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A leafing leather cover of a cellular phone, the leafing leather cover comprising:
   a leather cover, for buckling to a touch panel of a smart phone;
   wherein the leather cover is connected to a rear shell body of the smart phone by way of a micro-buckling connection portion, a clasping portion is disposed on the micro-buckling connection portion, the clasping portion adapts to a clasping hole in the rear shell body, and the clasping portion is embedded to a clasping ring in the clasping hole wherein the clasping ring is used to clasp opposite recesses of the clasping portion for holding the micro-buckling connection portion;
   wherein a magnetic strip disposed in the leather cover is attracted to a magnet in a front shell body of the smart phone, and the magnetic strip is disposed in the other side opposite to a connection side of the leather cover;
   wherein a recess slot is disposed in an assembly surface of the micro-buckling connection portion and the recess slot is used to fasten a connection side of the leather cover, a side of the recess slot communicates with a lateral surface of the micro-buckling connection portion, and a bottom region of the clasping portion is integrally connected to a bottom surface of the recess slot; and wherein a plurality of stationary posts are further disposed on the bottom surface of the recess slot for fastening the leather cover, a first stationary hole is disposed on the connection side of the leather cover to be passed by the stationary posts, a steel sheet is used to tightly press the connection side of the leather cover in the recess slot of the micro-buckling connection portion, and a second stationary hole is disposed in the steel sheet to be passed by the stationary posts.

2. The leafing leather cover of the cellular phone of claim 1, wherein the magnetic strip is embedded to an internal portion of the leather cover.

3. The leafing leather cover of the cellular phone of claim 1, wherein the connection side of the leather cover further comprises a first notch for preventing an interference with the clasping portion, and the steel sheet further comprises a second notch for avoiding the interference with the clasping portion.

4. The leafing leather cover of the cellular phone of claim 3, wherein a transparent Mylar sheet is covered with a surface of the steel sheet, and a plurality of third notches disposed on the transparent Mylar sheet adapts to the clasping portion to be passed therethrough.

5. The leafing leather cover of the cellular phone of claim 1, wherein a lateral side of the recess slot further comprises a buckling rib which is adapted to the steel sheet to tightly press the leather cover.

6. A leafing leather cover of a cellular phone, the leafing leather cover comprising:

a leather cover, for buckling to a touch panel of a smart phone;

wherein the leather cover is connected to a rear shell body of the smart phone by way of a micro-buckling connection portion, a clasping portion is disposed on the micro-buckling connection portion, the clasping portion adapts to a clasping hole in the rear shell body, and the clasping portion is embedded to a clasping ring in the clasping hole wherein the clasping ring is used to clasp opposite recesses of the clasping portion for holding the micro-buckling connection portion; and wherein a recess slot is disposed in an assembly surface of the micro-buckling connection portion, a plurality of stationary posts are further disposed on a bottom surface of the recess slot for fastening the leather cover, a first stationary hole is disposed on a connection side of the leather cover to be passed by the stationary posts, a steel sheet is used to tightly press the connection side of the leather cover in the recess slot of the micro-buckling connection portion, and a second stationary hole is disposed in the steel sheet to be passed by the stationary posts.

7. The leafing leather cover of the cellular phone of claim 6, wherein a magnetic strip disposed in the leather cover is attracted to a magnet in a front shell body of the smart phone, and the magnetic strip is disposed in the other side opposite to the connection side of the leather cover.

8. The leafing leather cover of the cellular phone of claim 7, wherein the magnetic strip is embedded to an internal portion of the leather cover.

9. The leafing leather cover of the cellular phone of claim 6, wherein the recess slot is used to fasten the connection side of the leather cover, a side of the recess slot communicates with a lateral surface of the micro-buckling connection portion, and a bottom region of the clasping portion is integrally connected to the bottom surface of the recess slot.

10. The leafing leather cover of the cellular phone of claim 6, wherein the connection side of the leather cover further comprises a first notch for preventing an interference with the clasping portion, and the steel sheet further comprises a second notch for avoiding the interference with the clasping portion.

11. The leafing leather cover of the cellular phone of claim 10, wherein a transparent Mylar sheet is covered with a surface of the steel sheet, and a plurality of third notches disposed on the transparent Mylar sheet adapts to the clasping portion to be passed therethrough.

12. A smart phone comprising a cellular phone body and a leafing leather cover which is disposed on a surface of the cellular phone body, and the leafing leather cover of cellular phone comprising a leather cover for buckling to a touch panel of the smart phone;

wherein the leather cover is connected to a rear shell body of the smart phone by way of a micro-buckling connection portion, a clasping portion is disposed on the micro-buckling connection portion, a clasping hole disposed in the rear shell body of the cellular phone body adapts to the clasping portion to be passed therethrough, a clasping ring is disposed on an internal side of the rear shell body near the clasping hole, and the clasping portion adapts to the clasping hole in the rear shell body, and the clasping portion is embedded to the clasping ring in the clasping hole wherein the clasping ring is used to clasp opposite recesses of the clasping portion for holding the micro-buckling connection portion; and wherein a recess slot is disposed in an assembly surface of the micro-buckling connection portion, a plurality of stationary posts are further disposed on a bottom surface of the recess slot for fastening the leather cover, a first stationary hole is disposed on a connection side of the leather cover to be passed by the stationary posts, a steel sheet is used to tightly press the connection side of the leather cover in the recess slot of the micro-buckling connection portion, and a second stationary hole is disposed in the steel sheet to be passed by the stationary posts.

13. The smart phone of claim 12, wherein a magnetic strip disposed in the leather cover is attracted to a magnet in a front shell body of the smart phone, and the magnetic strip is disposed in the other side opposite to the connection side of the leather cover.

14. The smart phone of claim 13, wherein the magnetic strip is embedded to an internal portion of the leather cover.

15. The smart phone of claim 12, wherein the recess slot is used to fasten the connection side of the leather cover, a side of the recess slot communicates with a lateral surface of the micro-buckling connection portion, and a bottom region of the clasping portion is integrally connected to the bottom surface of the recess slot.

16. The smart phone of claim 12, wherein the connection side of the leather cover further comprises a first notch for preventing an interference with the clasping portion, and the steel sheet further comprises a second notch for avoiding the interference with the clasping portion.

17. The smart phone of claim 16, wherein a transparent Mylar sheet is covered with a surface of the steel sheet, and a plurality of third notches disposed on the transparent Mylar sheet adapts to the clasping portion to be passed therethrough.

* * * * *